(12) United States Patent
Liu et al.

(10) Patent No.: US 8,609,277 B2
(45) Date of Patent: Dec. 17, 2013

(54) SECONDARY BATTERY

(75) Inventors: Daotan Liu, Guangdong (CN);
Zhaokuan Liu, Guangdong (CN);
Rongguang Huang, Guangdong (CN);
Chuntai Guo, Guangdong (CN)

(73) Assignee: Bak Electronic (Shenzhen) Co., Ltd., Shenzhen (CN)

( * ) Notice: Subject to any disclaimer, the term of this patent is extended or adjusted under 35 U.S.C. 154(b) by 282 days.

(21) Appl. No.: 12/997,715

(22) PCT Filed: Sep. 23, 2008

(86) PCT No.: PCT/CN2008/072460
§ 371 (c)(1),
(2), (4) Date: Mar. 9, 2011

(87) PCT Pub. No.: WO2009/149607
PCT Pub. Date: Dec. 17, 2009

(65) Prior Publication Data
US 2011/0159358 A1 Jun. 30, 2011

(30) Foreign Application Priority Data
Jun. 13, 2008 (CN) .......................... 2008 1 0067717

(51) Int. Cl.
*H01M 2/06* (2006.01)
*H01M 2/26* (2006.01)

(52) U.S. Cl.
USPC ........................................ 429/164; 429/181

(58) Field of Classification Search
USPC .................................. 429/164, 181
See application file for complete search history.

(56) References Cited

U.S. PATENT DOCUMENTS

| 5,849,431 A * | 12/1998 | Kita et al. ............... 429/164 |
| 6,040,086 A | 3/2000 | Yoshida et al. |
| 7,318,980 B2 | 1/2008 | Kim |
| 2006/0204841 A1 | 9/2006 | Satoh et al. |
| 2007/0117011 A1 * | 5/2007 | Myerberg et al. ............ 429/164 |

FOREIGN PATENT DOCUMENTS

| CN | 1579027 A | 2/2005 |
| CN | 1694279 A | 11/2005 |
| CN | 1832228 A | 9/2006 |
| CN | 2824317 Y | 10/2006 |
| JP | 2005-322415 A | 11/2005 |

OTHER PUBLICATIONS

ISR for PCT/CN2008/072460 dated Mar. 5, 2009.

* cited by examiner

*Primary Examiner* — Gregg Cantelmo
(74) *Attorney, Agent, or Firm* — Lowe Hautpman & Ham, LLP

(57) ABSTRACT

Provided is a secondary battery comprising a core (7), tabs (4) protruding from an end of the core (7), a tab lead-out device placed at the end of the core (7), and a cover plate (1). The tab lead-out device includes an insulating layer (6) adjacent to the end of the core (7) and a conductive layer (5) distant from the end of the core (7). The tabs (4) are electrically connected to the conductive layer (5). The conductive layer (5) is electrically connected to the cover plate (1). The secondary battery further comprises a connector and a pad (3) stacked between the conductive layer (5) of the tab lead-out device and the cover plate (1). The tabs (4) are compacted between the pad (3) and the conductive layer (5) of the tab lead-out device by the connector.

13 Claims, 3 Drawing Sheets

SECONDARY BATTERY

RELATED APPLICATIONS

The present application is National Phase of PCT/CN2008/072460 filed Sep. 23, 2008 and and claims priority from, Chinese Application Number 200810067717.2, filed Jun. 13, 2008.

TECHNICAL FIELD

The present invention relates to a secondary battery, in particular, to a connecting structure between tabs and a cover plate of the secondary battery.

BACKGROUND

A lithium-ion secondary battery is composed of a negative polar plate, a positive polar plate, an electrolytic solution and a membrane between the positive and negative polar plates for preventing a short circuit. The positive polar plate and the negative polar plate are formed as a thin plate or a foil. The electrical polar plates and the membrane therebetween are orderly stacked or helically wound so as to form a core, which is in turn embedded into a battery container made of a stainless steel, a nickel plated iron, an aluminum metal or a stacked flexible package thin film. Then, after electrolytic solution is injected into the battery container, the battery container is sealed and the battery is formed. The core is electrically connected to external components by a connection between tabs connected to the polar plates and a pole or a cover plate.

In the prior art, it is general that the tabs are welded at the pole of the cover plate. When a heavy current is discharged, for example, in a hybrid electrical vehicle (HEV) or an electrical vehicle (EV), if a connection at places such as the tabs and the pole is broken or inactive, a serious heating may occur, resulting in an overheating, even a failure, of the battery. Thus, the safety and cycle life of the battery may be influenced. In addition, the welding position may not be controlled accurately when a plurality of tabs are connected to the pole, which is unfavorable for the control of technology and quality.

SUMMARY

The present invention aims to overcome the above-mentioned disadvantages. Thus the present invention provides a secondary battery, which improves the connection between a plurality of tabs and the pole, reduces the internal resistance of the battery and decreases the heat produced by the battery.

The technical solution of the invention is implemented as follows.

The secondary battery comprises a core and a cover plate, wherein tabs are protruded from an end of said core, said tabs comprises positive tabs and negative tabs.

The secondary battery is characterized in that a tab lead-out device is provided at the end of the core, said tab lead-out device comprises an insulating layer adjacent to the end of the core and a conductive layer away from the end of the core, said tabs are electrically connected to the conductive layer, and said conductive layer is electrically connected to the cover plate.

Said tab lead-out device is of a structure that the insulating layer and conductive layer are formed integratedly.

Said tab lead-out device is in a shape of a disk.

Pores are disposed in said tab lead-out device, said tabs passes through the pores and are then electrically connected to the conductive layer.

The pores in said tab lead-out device are in a shape of sectors.

Said tabs protrude from an outer edge of the tab lead-out device and are then electrically connected to the conductive layer.

Said tab lead-out device comprises an insulating pad and a first pad. Said insulating pad forms said insulating layer, and said first pad forms said conductive layer.

Said insulating pad and said first pad are in a shape of a disk.

Said insulating pad is provided with pores, said first pad is provided with pores. Said tabs passes through the pores in said insulating pad and the pores in the first pad and are then electrically connected to the first pad.

The pores in said insulating pad and the pores in the first pad are in a shape of sectors.

Said tabs protrude from outer edges of the insulating pad and the first pad and are then electrically connected to the first pad.

The secondary battery further comprises a connector and a second pad stacked between the conductive layer of the tab lead-out device and the cover plate. The tabs are compacted between the second pad and the conductive layer of the tab lead-out device by said connector.

Said second pad is provided with pores at positions corresponding to the tabs.

Said connector is a bolt connector.

A screw of said bolt connector is fixedly disposed on the conductive layer of the tab lead-out device. The second pad is compacted on the conductive layer of the tab lead-out device by the nut.

The conductive layer of said tab lead-out device is electrically connected to the cover plate by said connector.

A pole is disposed on said cover plate. Said connector is electrically connected to the pole on the cover plate.

The connection between said tabs and the conductive layer of the tab lead-out device is a welding connection.

The connection between said tabs and the conductive layer of the tab lead-out device is a laser ablation welding connection.

Said positive tabs and negative tabs comprise a plurality of positive tabs and a plurality of negative tabs, respectively.

Said plurality of positive tabs are located at one end of the core, said plurality of negative tabs are located at the other end of the core.

The connection between said plurality of tabs and the conductive layer of the tab lead-out device is a welding connection.

Said plurality of tabs are welded to the conductive layer of the tab lead-out device at corresponding positions, respectively.

The advantageous effects of the invention in contrast to the prior art are:

1. A tab lead-out device is provided, so that the tabs are electrically connected to the tab lead-out device fixedly and thus the connecting points of the tabs are reliable and stable.

2. Pores are disposed at fixed positions in the tab lead-out device. This ensures that the connecting positions of the tabs, for example, welding positions, are accurate and consistent and the welding can be performed conveniently, which are beneficial to improve the production efficiency. In particularly, for a core with a plurality of tabs, it is ensured that the welding position of each tab is accurate.

3. A second pad is provided. By the mechanical compact of the second pad, it is ensured that the tabs of the core are reliably connected to the pole. The effective contact area between the tabs and the pole is also increased.

4. A laser ablation welding is applied between the tabs and the tab lead-out device, which further improves the conductive efficiency, ensures the battery performance when discharging, reduces the internal resistance of the battery, decreases the heat produced by battery and improves the battery cycle life.

5. The tab lead-out device, the second pad and the cover plate are tightly contacted, which ensures the stable fixation of the core. The connecting structure between the tabs and the pole of the battery is simple and convenient to be assembled. The manufacture is economical, and it is easy for the line production and convenient for the industrialized production.

The present invention is very suitable for the cylinder battery with multiple tabs and a large size. The core may be fixed efficiently, the vibration resistance and the compact resistance of battery are improved, and then the safety performance of the battery is improved. So, it is suitable for the battery of hybrid electrical vehicle and electrical vehicle, and it also can be used for the large-sized energy storage cell.

DETAILED DESCRIPTION

Embodiment 1

Figure 1:
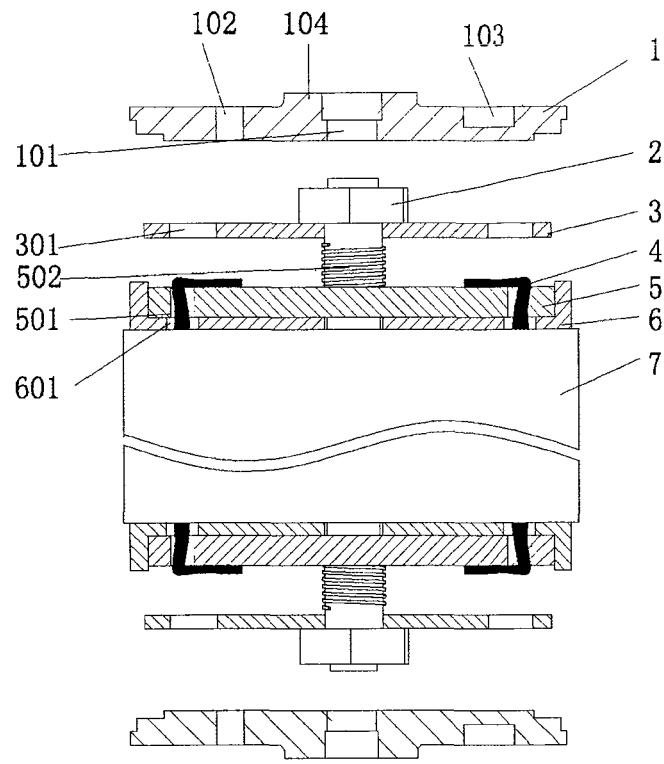
FIG. 1 is a structural schematic diagram of a first embodiment of the present invention.

A secondary battery, as shown in FIG. 1, comprises a cover plate 1, a connector, a tab lead-out device, a second pad 3 and a core 7. The tab lead-out device includes an insulating pad 6 and a first pad 5. The insulting pad 6 constitutes an insulting layer. The first pad 5 constitutes a conductive layer. The connector includes a nut 2 and a screw 502 fixed to the first pad. Battery polar plates are wound to form the core 7 in a cylinder shape. A plurality of tabs 4 are protruded from each end of the core 7. The tabs at one end of the core 7 are positive tabs, and those at the other end are negative tabs. The tabs at both ends are connected to the cover plate via connections having a same structure.

Figure 2:
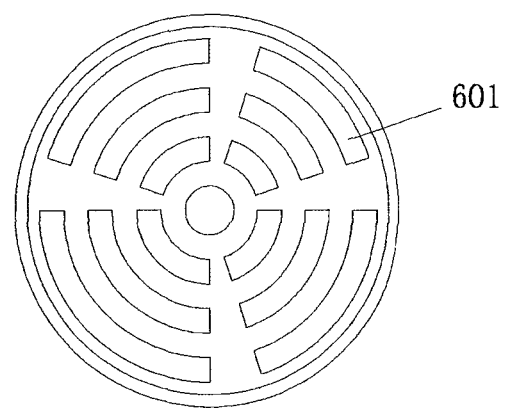
FIG. 2 is a structural view of the insulating pad in FIG. 1.
Figure 3:
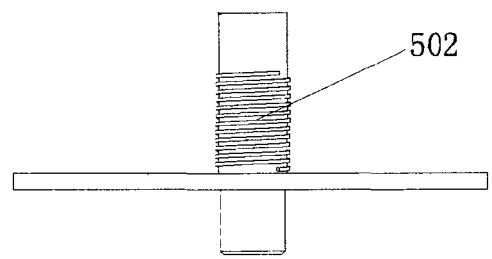
FIG. 3 is a structural view of the first pad in FIG. 1.
Figure 4:
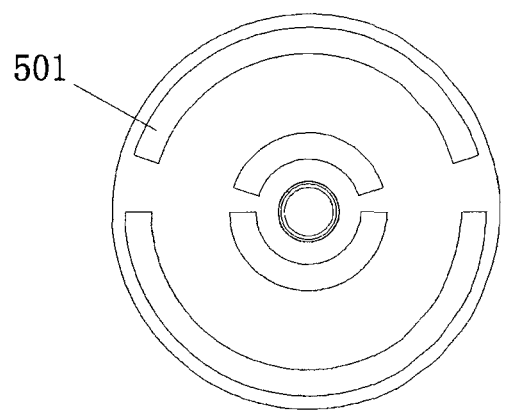
FIG. 4 is a top view of FIG. 3.
Figure 5:
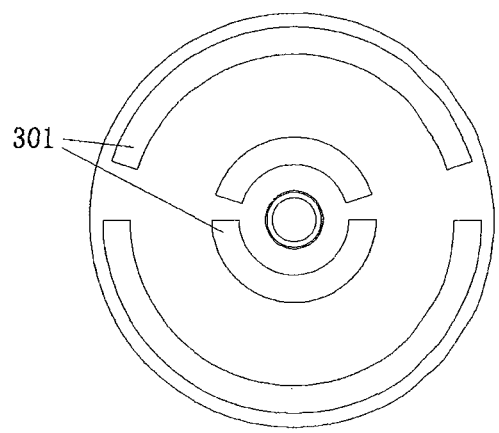
FIG. 5 is a structural view of the second pad in FIG. 1.
Figure 6:
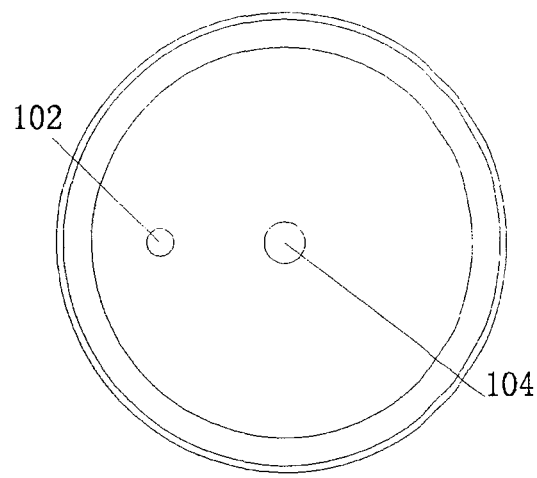
FIG. 6 is a structural view of the cover plate in FIG. 1.

The insulting pad 6 is circular, and is placed at an end of the core 7. As shown in FIG. 2, pores 601 in the form of discontinuous sectors are disposed at the insulting pad 6. The first pad 5 is stacked on the insulating pad 6. As shown in FIGS. 3 and 4, pores 501 in the form of discontinuous sectors are disposed in the first pad 5, and a screw 502 having screw threads is further disposed at the center of the first pad 5. An upper end of the screw 502 passes through a center hole of the insulating pad 6. A lower end of the screw 502 passes through a center hole of the second pad 3. The second pad 3 is fastened with the first pad by a nut 2. As shown in FIG. 5, pores 301 are disposed in the second pad 3. The cover plate 1 as shown in FIG. 6 is placed on the second pad 3. A pole 104 is provided on the cover plate 1. A center hole 101 is disposed at the center of the pole 104. The cover plate 1 further comprises an infusing hole 102 and an explosion proof hole 103. The first pad 5, the second pad 6, the tabs 4, the cover plate 1, the pole 104 are made of conductive metal material. The cover plate 1 is insulated from the pole 4.

During assembling, the tabs 4 passes through the pores 601 of the insulting pad 6 and the pores 501 of the first pad and protrudes from the insulting pad 6. Then, the tabs 4 are planished on the first pad 5 and are welded to the first pad 5 by a laser spot welding or a continuous welding. The second pad 3 is placed on the first pad 5. That is, the screw 502 of the first pad passes through the center hole of the second pad 3, so that the tabs 4 are located between the two metal pads and then clamped by screwing the nut 2. Finally, the cover plate 1 is placed so that the center hole 101 of the cover plate 1 tightly combines with a slick portion of the upper end of the screw 502 of the first pad 5, both of which are then welded together by the laser welding. The center hole 101 has a shape matching with that of the upper end of the screw 502, which may be circular, quadrate or the like.

The step of welding the tabs 4 to the first pad 5 may also be carried out after the second pad 3 is placed. In this case, the tabs 4 may be welded to the first pad 5 through the pores 301 of the second pad by the laser spot welding or the continuous welding.

Optionally, the poles 104 may be not provided on the cover plate on one end of the core 7. In this case, the positive tabs or the negative tabs may be electrically connected to the conductive cover plate 1 directly.

In another embodiment, both of the positive tabs and the negative tabs are placed at a same end of the core 7. In this case, electrical connections for connecting the positive, negative tabs with two poles disposed on the cover plate, respectively, are electrically insulated from each other by an insulating component.

Embodiment 2

Figure 7:
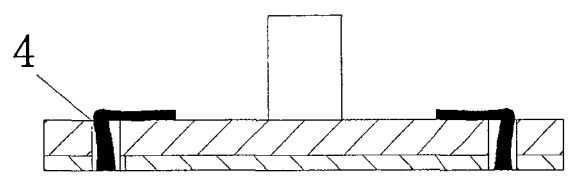
FIG. 7 is a structural view of the tab lead-out device of a second embodiment of the present invention.

A secondary battery comprises a cover plate, a connector, a tab lead-out device, a second pad and a core. The secondary battery according to this embodiment differs from that of the embodiment 2 in that the tab lead-out device of the battery is of a structure that the insulating layer and the conductive layer are integratedly formed. As shown in FIG. 7, the tab lead-out device is divided into an upper layer and a lower layer. The upper layer is a conductive layer, and the lower layer is an insulting layer. The tabs passes from the lower portion of the insulting layer through the pores of the tab lead-out device and then welded on the conductive layer.

Embodiment 3

Figure 8:
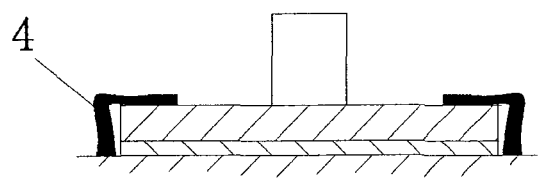
FIG. 8 is a structural view of the tab lead-out device of a third embodiment of the present invention.

A secondary battery comprises a cover plate, a connector, a tab lead-out device, a second pad and a core. The secondary battery according to the third embodiment differs from that of the embodiment 2 in that no pore is disposed in the tab lead-out device. As shown in FIG. 8, the tabs protrudes an edge of the tab lead-out device from the lower portion of the insulating layer and welded on the conductive layer.

Hereinabove, the present invention is described in detail with reference to non-limited particular embodiments. It will be understood by those skilled in the art that numerous simple deductions or substitutions may be carried out without exceeding the conception of the invention, all of which are to be considered within the protective scope of the present invention.

What is claimed is:

1. A secondary battery, comprising a core (7) and cover plates (1), wherein positive tabs (4) are protruded from a first end of the core (7), and negative tabs (4) protrude from a second end of the core, characterized in that, for each of the positive tabs and negative tabs, a tab lead-out device is provided at a respective end of the core, the tab lead-out device comprises an insulating layer adjacent to the respective end of the core and a conductive layer away from the respective end of the core, said each of the positive tabs and negative tabs is electrically connected to the conductive layer, and the conductive layer is electrically connected to a respective cover plate (1), wherein the secondary battery further comprises a connector and a second pad (3) stacked between the conductive layer of the tab lead-out device and the respective cover plate (1), and said each of the positive tabs and negative tabs is compacted between the second pad (3) and the conductive layer of the tab lead-out device by the connector.

2. The secondary battery of claim 1, characterized in that, the tab lead-out device is of a structure that the insulating layer and conductive layer are stacked together.

3. The secondary battery of claim 2, characterized in that, pores are disposed in the tab lead-out device, and said each of the positive tabs and negative tabs passes through the pores or protrude from an outer edge of the tab lead-out device and are then electrically connected to the conductive layer.

4. The secondary battery of claim 1, characterized in that, the tab lead-out device comprises an insulating pad (6) and a first pad (5), the insulating pad (6) forms the insulating layer, and the first pad (5) forms the conductive layer.

5. The secondary battery of claim 4, characterized in that, the insulating pad (6) is provided with pores (601), the first pad (5) is provided with pores (602), and said each of the positive tabs and negative tabs passes through the pores (601) in the insulating pad (6) and the pores (501) in the first pad (5) or protrude from outer edges of the insulating pad (6) and the first pad (5) and are then electrically connected to the first pad (5).

6. The secondary battery of claim 1, characterized in that, the second pad (3) is provided with pores (301) at positions corresponding to said each of the positive tabs and negative tabs.

7. (Previous presented) The secondary battery of claim 6, characterized in that, the connector is a bolt connector, a screw (502) of the bolt connector is fixedly disposed on the conductive layer of the tab lead-out device, and the second pad (3) is compacted on the conductive layer of the tab lead-out device by the nut (2).

8. The secondary battery of claim 1, characterized in that, the conductive layer of the tab lead-out device is electrically connected to respective the cover plate (1) by the connector.

9. The secondary battery of claim 8, characterized in that, a pole (104) is disposed on the respective cover plate (1), and the connector is electrically connected to the pole (104) on the respective cover plate (1).

10. The secondary battery of claim 1, characterized in that, the connection between said each of the positive tabs and negative tabs and the conductive layer of the tab lead-out device is a welding connection.

11. The secondary battery of claim 1, characterized in that, the positive tabs and negative tabs comprise a plurality of positive tabs and a plurality of negative tabs, respectively.

12. The secondary battery of claim 11, characterized in that, the plurality of positive tabs are located at the first end of the core (7), and the plurality of negative tabs are located at the second end of the core (7).

13. The secondary battery of claim 11, characterized in that, the connection between the plurality of each of the positive tabs and negative tabs (4) and the conductive layer of the tab lead-out device is a welding connection, and the plurality of each of the positive tabs and negative tabs (4) are welded to the conductive layer of the tab lead-out device at corresponding positions, respectively.

\* \* \* \* \*